United States Patent
Feng et al.

(10) Patent No.: US 11,843,858 B1
(45) Date of Patent: Dec. 12, 2023

(54) MACHINE LEARNING FOR PHASE DETECTION AUTOFOCUS

(71) Applicant: QUALCOMM Incorporated, San Diego, CA (US)

(72) Inventors: Wen-Chun Feng, New Taipei (TW); Jian-Jia Su, Changhua (TW); Hui Shan Kao, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/664,142

(22) Filed: May 19, 2022

(51) Int. Cl.
 *H04N 23/67* (2023.01)
 *H04N 23/45* (2023.01)
 *H04N 23/60* (2023.01)

(52) U.S. Cl.
 CPC .......... *H04N 23/672* (2023.01); *H04N 23/45* (2023.01); *H04N 23/64* (2023.01)

(58) Field of Classification Search
 CPC ....... H04N 23/672; H04N 23/45; H04N 23/64
 See application file for complete search history.

(56) References Cited

U.S. PATENT DOCUMENTS

| | | | |
|---|---|---|---|
| 2017/0094153 A1* | 3/2017 | Wang | H04N 25/704 |
| 2020/0260014 A1* | 8/2020 | Miyatani | H04N 25/704 |
| 2021/0126033 A1* | 4/2021 | Yang | H01L 27/14621 |
| 2021/0303968 A1 | 9/2021 | Donsbach et al. | |
| 2022/0100054 A1 | 3/2022 | Galor Gluskin et al. | |
| 2022/0191401 A1* | 6/2022 | Asukabe | G06V 40/16 |

OTHER PUBLICATIONS

International Search Report and Written Opinion—PCT/US2023/065110—ISA/EPO—dated Jun. 30, 2023.

* cited by examiner

*Primary Examiner* — Shahbaz Nazrul
(74) *Attorney, Agent, or Firm* — Qualcomm/Norton Rose Fulbright US LLP

(57) ABSTRACT

This disclosure provides systems, methods, and devices for image capture using an autofocus (AF) algorithm. In a first aspect, a method for autofocus includes receiving first image data of a first scene from a first image sensor of a first camera, the first image data comprising phase shift information; determining a first focal distance for the first scene based on a machine learning algorithm by inputting the phase shift information to the machine learning algorithm; and controlling a focal position of the first camera based on the first focal distance. Other aspects and features are also claimed and described.

23 Claims, 8 Drawing Sheets

MACHINE LEARNING FOR PHASE DETECTION AUTOFOCUS

TECHNICAL FIELD

Aspects of the present disclosure relate generally to image processing, and more particularly, to autofocus systems for image capture devices. Some features may enable and provide improved image processing, including the use of machine learning in determining a focal distance for a scene.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Autofocus (AF) algorithms improve user experience by allowing the keeping an image capture device focused on items of interest. When the AF algorithm fails to properly focus the image capture device, an image captured by the device appears blurry. A user viewing the blurry image recognizes the blurring as a reduced image quality. A photograph or video captured by the image capture device while the image capture device is not properly focused results in reduced user experience, particularly when the scene is rapidly changing and the image capture device cannot be reconfigured to obtain a second attempt at a photograph of the scene.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One example autofocus (AF) algorithm is phase detection autofocus (PDAF), which operates using phase detection information obtained from an image sensor of the image capture device. With PDAF, the phase shift between the left and right phase images generated by left and right phase detectors represents the level of focus. The sign of phase shift determines the direction of lens movement when the AF algorithm controls a lens coupled to the image sensor for obtaining image data, and the magnitude of phase shift determines an amount to move the lens. If the lens is at the in-focus position, a small or zero phase shift may be determined when the left and right phase images are identical. If the lens is at an out-of-focus position, a large phase shift may be determined.

PDAF operation to determine phase shift in an AF algorithm may be based on machine learning to provide better performance in certain scene conditions when the AF algorithm has difficulty determining a phase shift. For example, in low-light conditions machine learning for phase detection (MLPD) may be used to determine phase shift, and the machine-learning based phase shift value used to control a lens of the image capture device. In other examples, repeating or Moire patterns may be detected and the MLPD may be used to determine phase shift for controlling a lens. MLPD may be applied in other or all scene conditions to as part of AF algorithm executing on an image capture device. In some embodiments, MLPD may be selectively used as part of an AF algorithm by checking criteria to determine if certain scene conditions exist that benefit from machine learning. In some embodiments, the MLPD may use different training weights based on scene conditions to configure a machine learning algorithm, such as a neural network, to provide improved phase shift determination.

In one aspect of the disclosure, a method for image processing, such as in an image capture device, includes receiving first image data of a first scene from a first image sensor of a first camera, the first image data comprising phase shift information; determining a first focal distance for the first scene based on a machine learning algorithm by inputting the phase shift information to the machine learning algorithm; and controlling a focal position of the first camera based on the first focal distance.

In an additional aspect of the disclosure, an apparatus includes at least one processor and a memory coupled to the at least one processor. The at least one processor is configured to perform operations including receiving first image data of a first scene from a first image sensor of a first camera, the first image data comprising phase shift information; determining a first focal distance for the first scene based on a machine learning algorithm by inputting the phase shift information to the machine learning algorithm; and controlling a focal position of the first camera based on the first focal distance.

In an additional aspect of the disclosure, an apparatus includes means for receiving first image data of a first scene from a first image sensor of a first camera, the first image data comprising phase shift information; means for determining a first focal distance for the first scene based on a machine learning algorithm by inputting the phase shift information to the machine learning algorithm; and means for controlling a focal position of the first camera based on the first focal distance.

In an additional aspect of the disclosure, a non-transitory computer-readable medium stores instructions that, when executed by a processor, cause the processor to perform operations. The operations include receiving first image data of a first scene from a first image sensor of a first camera, the first image data comprising phase shift information; determining a first focal distance for the first scene based on a machine learning algorithm by inputting the phase shift information to the machine learning algorithm; and controlling a focal position of the first camera based on the first focal distance.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
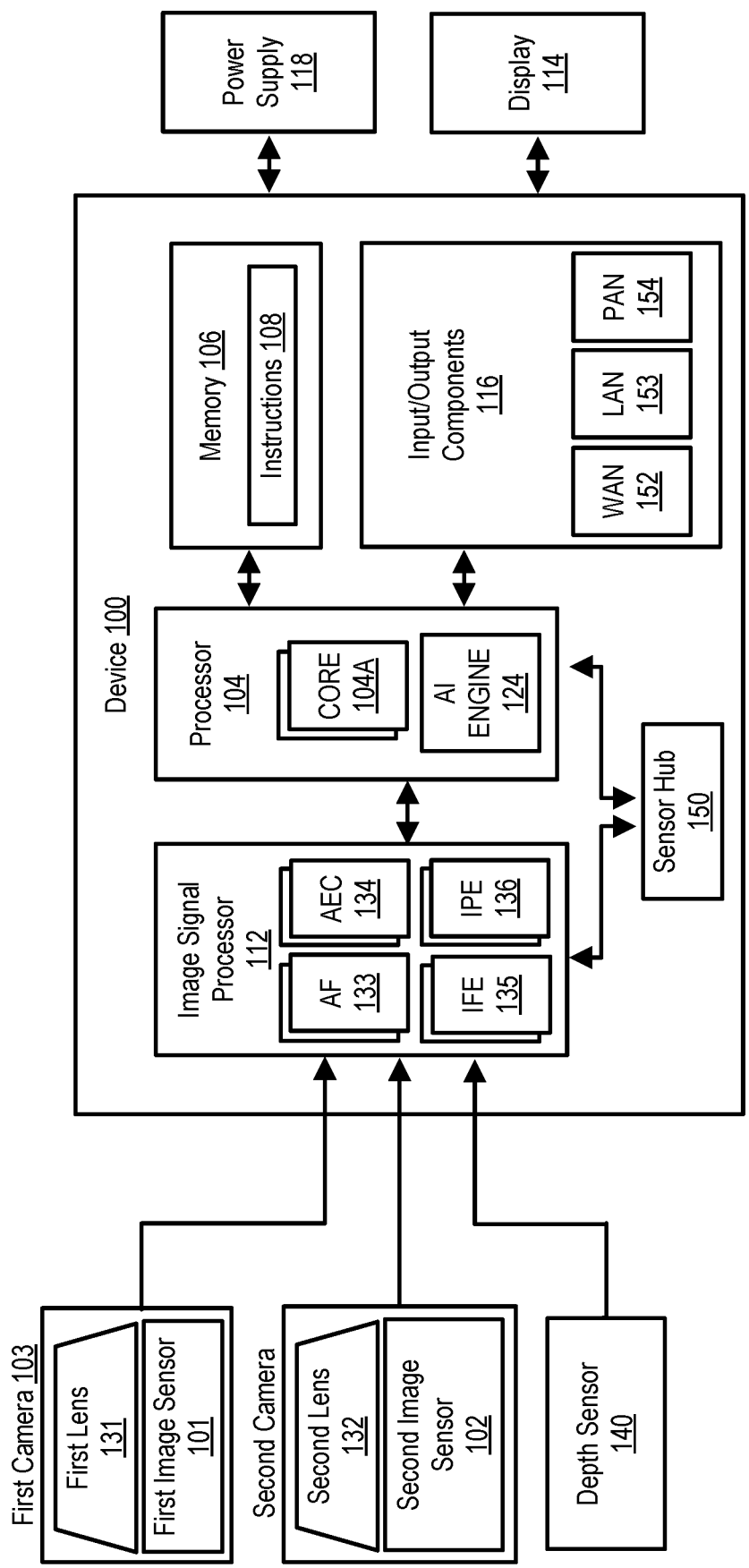
FIG. 1 shows a block diagram of an example device 100 for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image capture operations. Autofocus (AF) performed by an image capture device may use a machine learning algorithm to determine information for assisting with controlling the image capture device to improve focus of photographs or videos captured by the image capture device. For example, a representation of a focal distance of the scene, such as a phase shift value, may be determined by a machine learning algorithm using at least a portion of an image frame captured by the image capture device. A lens may be controlled based on the representation of focal distance to change the focal point of the image capture device to improve the focus of additional captured image frames.

Particular implementations of the subject matter described in this disclosure may be implemented to realize one or more of the following potential advantages or benefits. In some aspects, the present disclosure provides techniques for improving autofocus (AF) by providing better focus information for obtaining image frames from an image sensor that are in better focus. In some aspects, the present disclosure provides techniques for improving autofocus (AF) by providing faster focus for obtaining image frames from an image sensor to reduce delay experienced by a user of the image capture device. In lowlight scenes, machine learning-based AF may provide more reliable and stable results than available without machine learning. Further, the reliable results can be obtained in challenging scene conditions, such as Moire and other repeating patterns and lowlight.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video preview comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
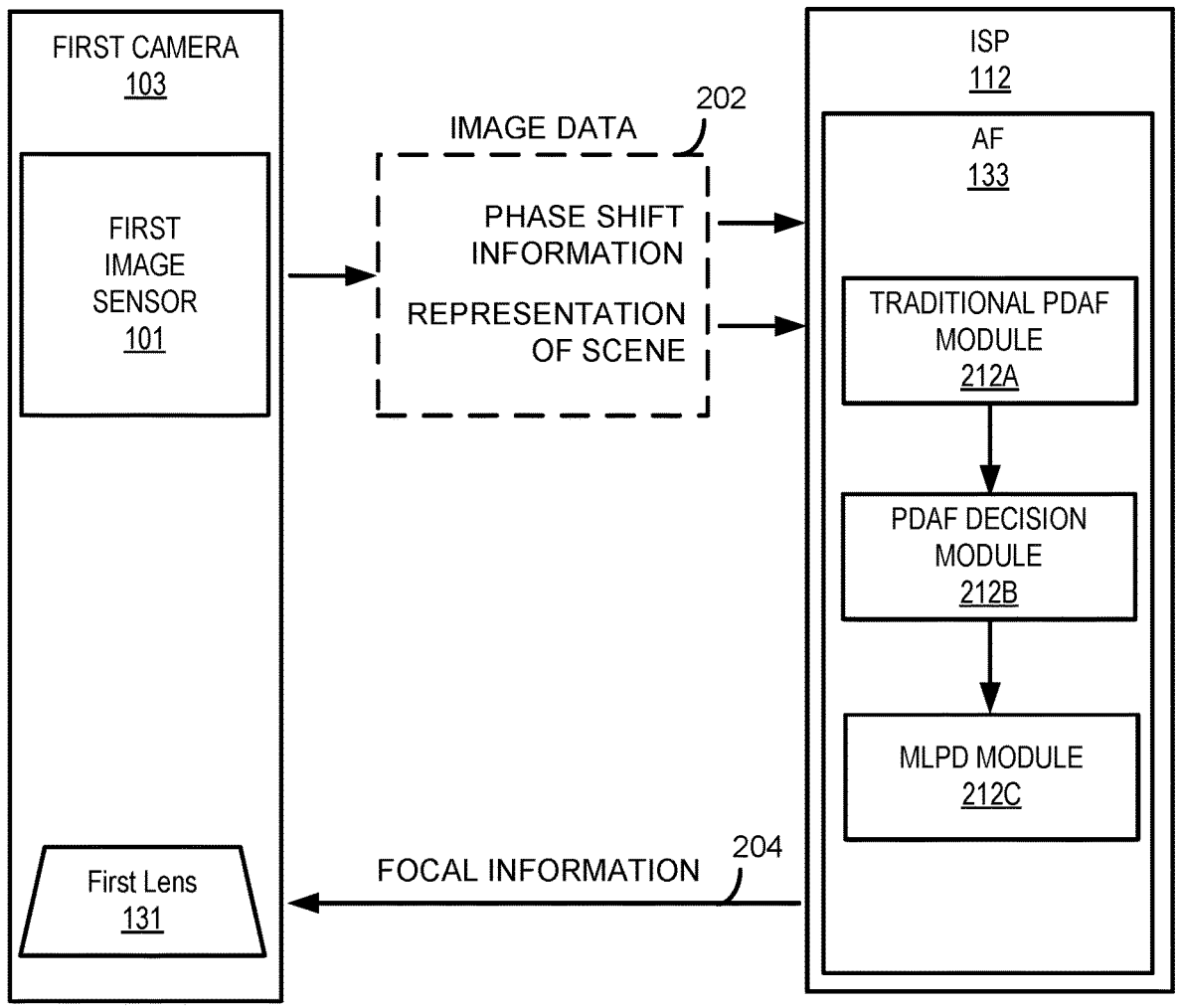
FIG. 2 is a block diagram illustrating an autofocus (AF) system using machine learning according to some embodiments of the disclosure.

The AF algorithm 133 of the image capture device 100 may be configured according to some or all aspects of the embodiments described with reference to FIGS. 2-7. FIG. 2 is a block diagram illustrating an autofocus (AF) system using machine learning according to some embodiments of the disclosure. The first image sensor 101 of camera 103 outputs image data 202, which may include phase shift information and/or a representation of a scene in the field of view of the image sensor 101. The phase shift information may include sensor data from one or more phase shift sensors embedded in the first image sensor 101. The representation of the scene may include Bayer formatted image data, although other image formats may be used to represent the scene. The ISP 112 is coupled to the first camera 103 to receive the image data 202, such as through a bus coupling the image sensor 101 to the ISP 112. Although functionality may be described as part of the ISP 112, other components may be configured to perform similar functionality in controlling an image capture device and providing autofocus capability in the first camera 103. For example, a processor, such as processor 104, or other general-purpose or fixed-function logic circuitry may be configured to provide the autofocus functionality described herein. In some embodiments, the autofocus functionality may be performed by the ISP 112 in conjunction with other processing circuitry, such as a AI engine 124. For example, the AI engine 124 may be embedded in the processor 104 and coupled to the ISP 112 through a bus. As another example, the AI engine 124 may be a separate component in the device 100 and coupled to the ISP 112 through a bus. As a further example, the AI engine 124 may be embedded in the ISP 112. In some embodiments, one or more of the ISP 112, the processor 104, and the AI engine 124 may be co-located on a shared substrate as a single integrated circuit (IC), which may be shared with other functionality including one or more of the sensor hub 150, memory 106, and/or I/O components 116.

The ISP 112 outputs focus information to the first camera 103 for controlling a focal distance of the first camera 103. The camera 103 may use the focus information to adjust a position of the first lens 131. The ISP 112 may be coupled over the same bus that transmits the image data 202, coupled through a different bus, or coupled through other control signals. In some embodiments, the focus information may include a focal distance determined by the ISP 112 to be an estimated focal point for the scene in view of the camera 103. The camera 103 may control the lens 131 according to the received focal distance by directly setting the lens position to the focal distance. In some embodiments, the focus information may include different data that the camera 103 uses to determine a position for the lens 131 and adjust the position of the lens 131 in accordance with the determined position. For example, the focus information may be a focus shift value that indicates a distance and/or direction to move the position of lens 131. The camera 103 may determine a new absolute position value for the lens 131 based on a current position value and the focus shift value, and adjust the lens 131 based on the new absolute position value.

The autofocus (AF) algorithm 133 executed by ISP 112 may include several components including traditional phase detection autofocus (PDAF) module 212A, PDAF decision module 212B, and machine learning phase detection (MLPD) module 212C. The traditional PDAF module 212A may include one or more non-machine learning AF algorithms, such as a phase detection AF algorithm that estimates an amount one image arriving at a PD sensor is shifted from another image arriving at a PD sensor. In some embodiments, the traditional PDAF module 212A may include a cross-correlation determination between images. The PDAF decision module 212B may determine how to determine the focus information transmitted to the camera 103. For example, the PDAF decision module 212B may determine whether to use one or both of the traditional PDAF module 212A and the MLPD module 212C to determine the focus information. As another example, the PDAF decision module 212B may determine how to use the MLPD module 212C to adjust focus information generated by the traditional PDAF module 212A and/or how to use the traditional PDAF module 212A to adjust focus information generated by the MLPD module 212C. In some embodiments, the AF algorithm 133 may include one or some of the modules 212A, 212B, 212C, and may include other modules for performing autofocus functions. For example, the AF algorithm 133 may perform autofocus using only machine learning in the MLPD module 212C for determining the focus information 204, such that the AF algorithm 133 does not include modules 212A and 212B. As another example, the AF algorithm 133 may include a tracking algorithm, such as object tracking or, specifically, face tracking. The object tracking may be cooperate with one or both of the traditional PDAF module 212A and the MLPD module 212C for determining the focus information.

Figure 3:
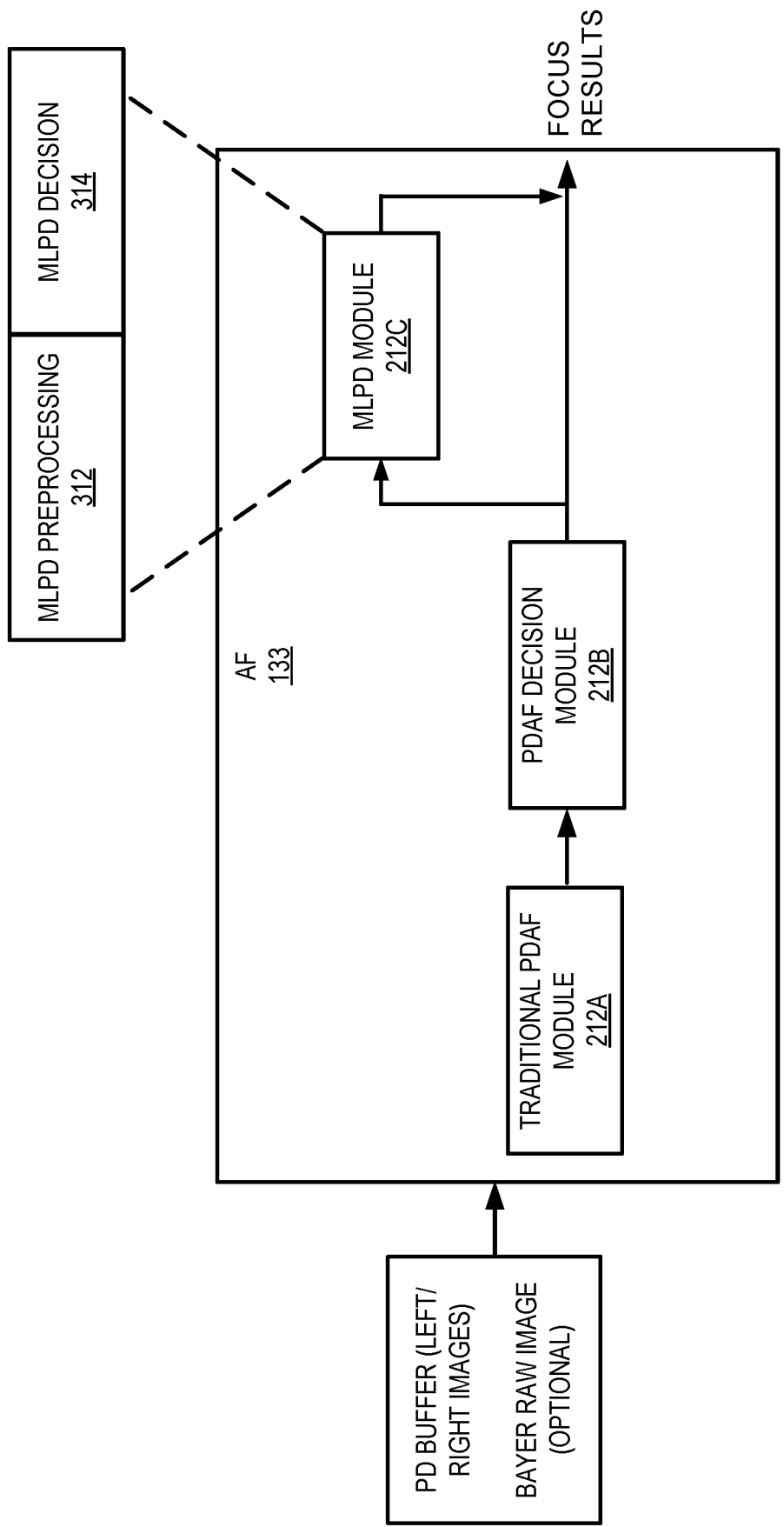
FIG. 3 is a block diagram illustrating an autofocus system using machine learning with multiple available machine learning configurations according to some embodiments of the disclosure.

One configuration of the AF algorithm 133 with modules 212A, 212B, and 212C is shown in FIG. 3. FIG. 3 is a block diagram illustrating an autofocus system using machine learning with multiple available machine learning configurations according to some embodiments of the disclosure. The AF algorithm 133 may receive phase shift information from phase detector (PD) buffers corresponding to left and right images corresponding to a first scene, and may additionally receive raw image data corresponding to a representation of the first scene. The traditional PDAF module 212A may determine first focus information, which is provided to PDAF decision module 212B. The PDAF decision module 212B may determine whether to provide the first focus information as the output of the AF algorithm based on one or more criteria. For example, one criteria may specify that the AF algorithm 133 output is the first focus information when a confidence level associated with the first focus information exceeds a threshold confidence level. As another example, a separate or additional criteria may specify that the AF algorithm 133 outputs the first focus information when certain scene conditions are detected, such as when an object is detected, when a certain object is detected, or when a certain light level is detected.

The MLPD module 212C may determine second focus information to replace or adjust the first focus information. The PDAF decision module 212B may determine whether to provide the second focus information as the output of the AF algorithm based on one or more criteria. For example, one criteria may specify that the AF algorithm 133 output is the second focus information when certain scene conditions are detected, such as when a light level below a threshold level is detected or when a confidence level of the PDAF module 212A is below a threshold level. In some embodiments, the MLPD module 212C determines the second focus information using filters from convolution layers for noise reduction, which achieves better focus information, particularly in noisy images captured in low-light scenes although the second focus information may be useful in all scenes.

The MLPD module 212C may be activated and deactivated by the PDAF decision module 212B to reduce power consumption during execution of the AF algorithm 133. The MLPD module 212C may consume more power than the traditional PDAF module 212A, and thus deactivating the MLPD module 212C when the traditional PDAF module 212A provides sufficient focus capability reduces power consumption. The reduced power consumption may be particularly advantageous when the image capture device executing the AF algorithm 133 is operated from battery power, such as with a mobile device. Additionally, deactivating the MLPD module 212C may reduce processing resources consumed, making the processing resources available to other algorithms to the extent processing resources are shared between AF algorithm 133 and other algorithms. Further, the MLPD module 212C may add delay to the determination of focus information, which may be eliminated when scene conditions permit traditional PDAF module 212A to provide sufficient focus information.

The MLPD module 212C may include MLPD preprocessing module 312 and MLPD decision module 314. The MLPD preprocessing module 312 may process image data representing the scene to obtain an input to a machine learning algorithm. For example, the machine learning algorithm may be configured to receive a fixed size image as input for prediction of focus information. In some embodiments, the machine learning algorithm is a neural network trained with a particular image size, and thus the image data may be preprocessed to obtain a sample of the same image size used for training the neural network. The preprocessing may include cropping, resizing, padding, or other image processing on the image data to determine an input to the machine learning algorithm. In some embodiments, the preprocessing may include determining a region of interest (ROI) in the scene corresponding to the trained size and cropping the image data to the ROI for input to the machine learning algorithm. The ROI may be determined, for example, by object recognition and/or user input. For example, the image capture device may allow a user to specify a region of interest by touching a location and/or defining a region on a display corresponding to a desired focal point. As another example, the preprocessing may include determining a ROI in the scene, cropping the image data to the ROI, and then resizing and/or padding the cropped image data to match the trained size for inputs to the machine learning algorithm.

In some embodiments, a single ROI may be applied to MLPD module 212C to output multiple focus results. For example, an region of interest corresponding to a window around a portion of image data may be divided into a plurality of N subwindows, such as a 4×3 array of subwindows. A weighted average may be determined from the N subwindows and used in determining focus information for the ROI based on N sets of statistics determined from the N subwindows.

The MLPD decision module 314 may determine a configuration for a machine learning algorithm when determining focus information. This may improve focus results in certain scene conditions that are difficult for phase detection algorithms. For example, focus on Moire or repeating patterns in a scene may be improved using a machine learning algorithm specifically trained for image scene comprising such patterns.

Figure 4:
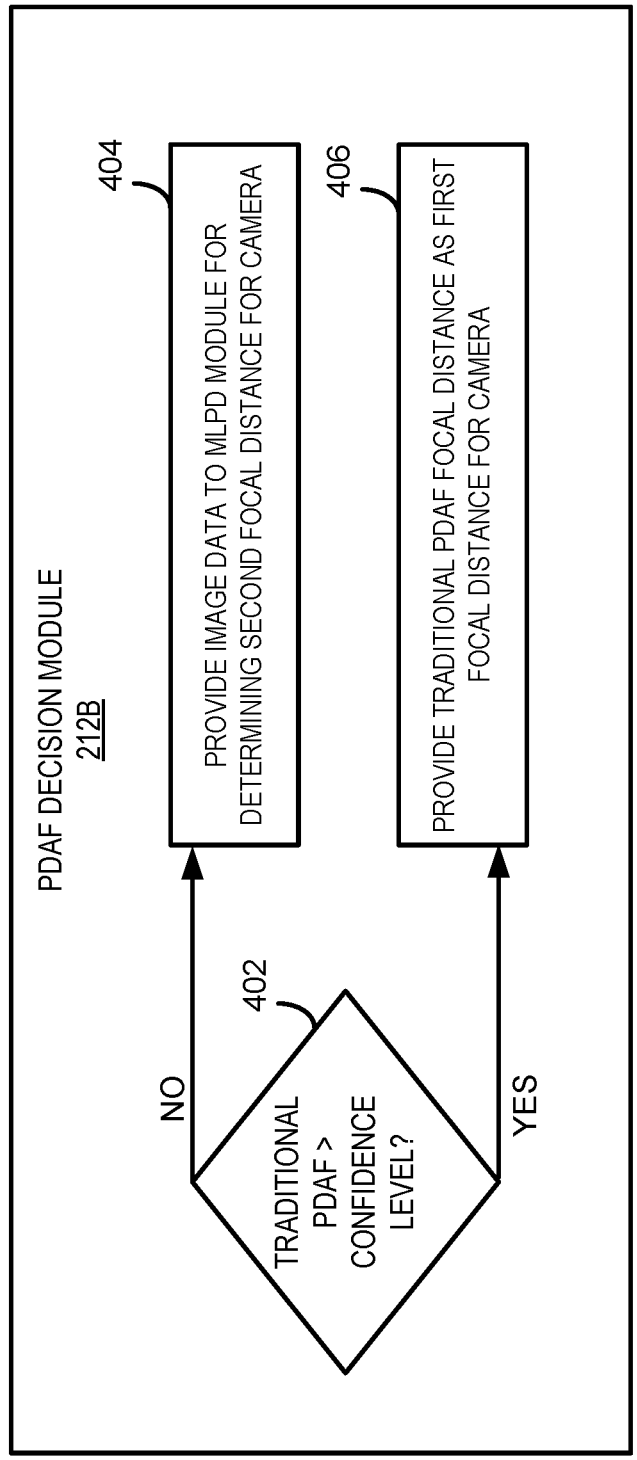
FIG. 4 is a block diagram illustrating a PDAF decision module for determining the application of machine learning in the autofocus system according to some embodiments of the disclosure.

One example embodiment for the PDAF decision module 212B applying a criteria for operation of the AF algorithm is shown in FIG. 4. FIG. 4 is a block diagram illustrating a PDAF decision module for determining the application of machine learning in the autofocus system according to some embodiments of the disclosure. At block 402, the PDAF decision module 212B receives the traditional PDAF focus information and determines if the focus information has a confidence level above a threshold level. If so, at block 406 the traditional PDAF focal distance is transmitted as a first focal distance to the camera. For example, the ISP 112 executing the PDAF decision module 212B may transmit, at block 406, a command to the camera to focus at a focal distance corresponding to the output of the traditional PDAF module 212A. If the confidence level is below the confidence threshold then, at block 404, the image data is provided to the MLPD module 212C and a second focal distance is determined based on machine learning.

Figure 5:
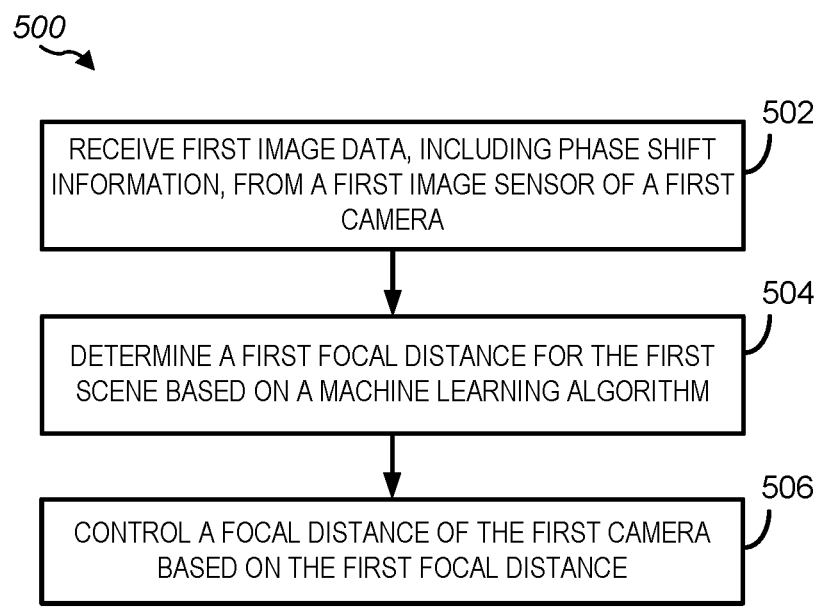
FIG. 5 is a flow chart illustrating a method of controlling a focal distance of a camera using machine learning according to some embodiments of the disclosure.

A method, according to embodiments described herein, for performing autofocus on an image capture device is shown in FIG. 5. FIG. 5 is a flow chart illustrating a method of controlling a focal distance of a camera using machine learning according to some embodiments of the disclosure. A method 500 includes, at block 502, receiving first image data including phase shift information. The first image data may be received from a first image sensor of a first camera of the image capture device. The first image sensor may include a plurality of phase detectors at different locations to record corresponding pairs of phase information for left and right images. The phase detectors may be embedded in an image sensor configured to obtain image data comprising a representation of a scene. At block 504, a first focal distance is determined for the first scene based on a machine learning algorithm. For example, the MLPD module 212C may be used to determine the first focal distance as focus information. The determination at block 504 may include, for example, determining of whether to use MLPD module 212C by PDAF decision module 212B. At block 506, a focal distance of the first camera is controlled based on the first focal distance determined at block 504 using machine learning.

Figure 6:
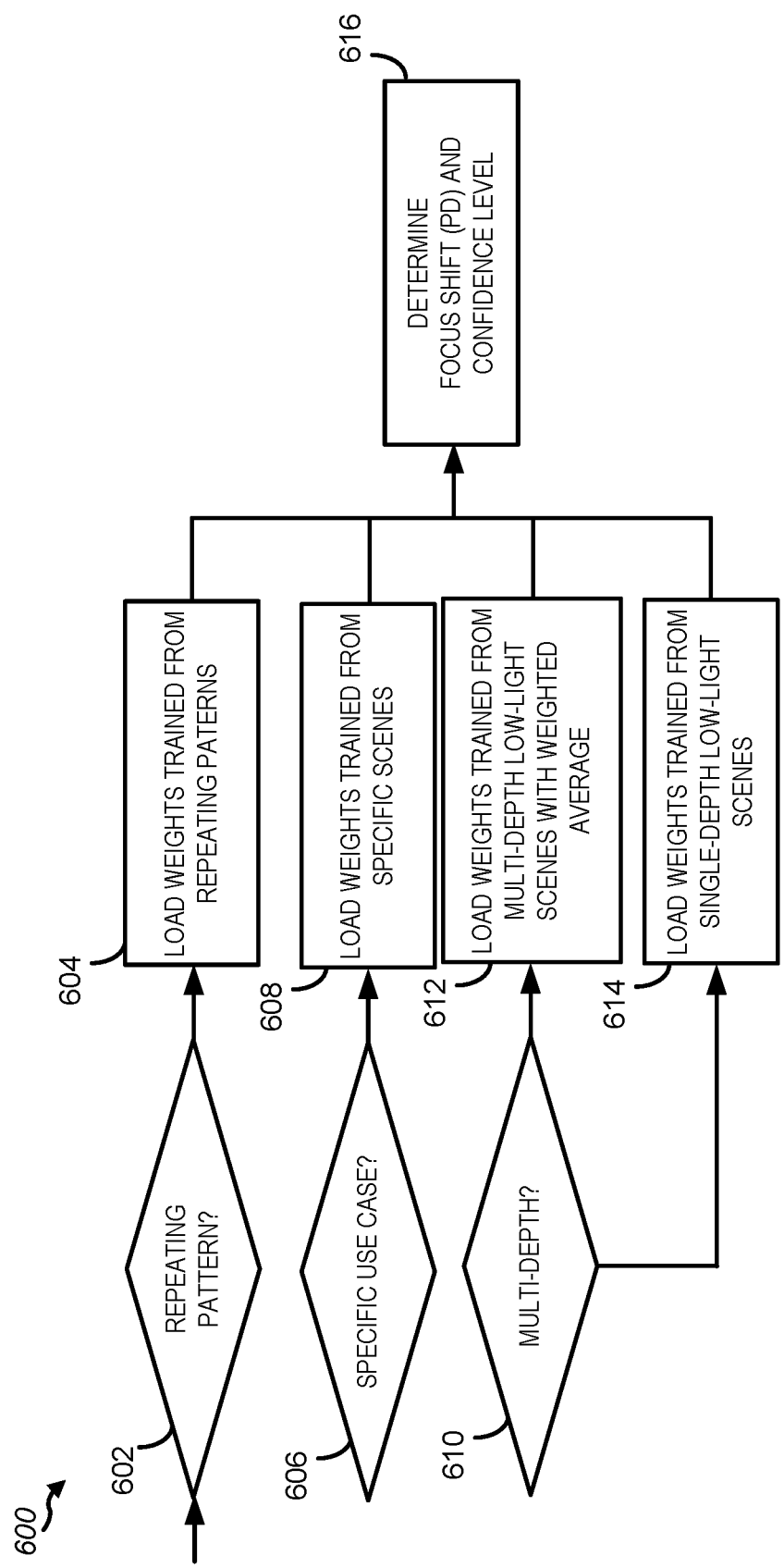
FIG. 6 is a flow chart illustrating a method of determining a machine learning configuration for determining a focal distance of a camera according to some embodiments of the disclosure.

Determining the first focal distance for the first scene at block 504 may include configuring the machine learning based on scene conditions as shown in FIG. 6. FIG. 6 is a flow chart illustrating a method of determining a machine learning configuration for determining a focal distance of a camera according to some embodiments of the disclosure. A method 600 may include, at block 602, determining whether the scene includes a repeating pattern. If so, the machine learning is configured by loading weights trained from repeating patterns at block 604. If not, at block 606, the method 600 includes determining if the scene condition reflects a normal use case. If so, the machine learning is configured by loading weights trained from a normal use scene at block 608. If not, at block 610, the method 600 includes determining if the scene conditions reflect a multi-depth scene. If so, the machine learning is configured by loading weights trained from multi-depth lowlight scenes at block 612. In some embodiments, the weights of block 612 may be determined through weighted averages, such as described with reference to FIG. 7. If not, at block 614, the method 600 includes the machine learning being configured by loading weights trained from single-depth low-light scenes. After loading weights according to one of blocks 604, 608, 612, and 614, the method 600 includes determining a focus shift and confidence level using machine learning in MLPD module 212C at block 616.

Figure 7:
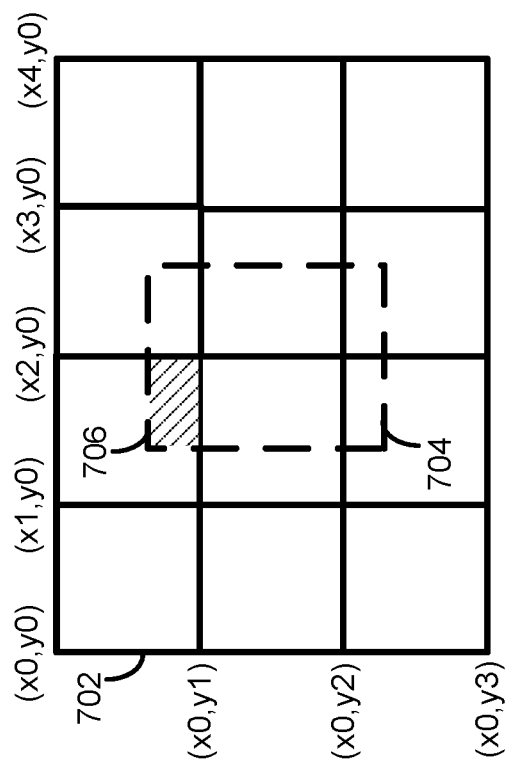
FIG. 7 is an illustration for determining weights for a machine learning algorithm according to some embodiments of the disclosure.

FIG. 7 is an illustration for determining weights for a machine learning algorithm according to some embodiments of the disclosure. An image portion 702 may extend from coordinates (x0,y0) in one corner to (x4,y3) in an opposite corner of an example image portion 702 divided into 12 subwindows arranged in a 4×3 grid, each having its own determined focal distance. The image portion 702 may represent a fixed size image that the machine learning algorithm is configured to receive by being trained using training images of the same fixed size image as image portion 702. A region of interest (ROI) 704 for focusing may be a smaller portion of the image portion 702, such as a face portion of a larger image portion. The ROI 704 may be a floating window that moves around the fixed size image portion 702 corresponding to movement of the object of interest within the image portion 702. The ROI 704 may be defined by coordinates (fx0,fy0) in one corner and (fx1,fy1) in an opposite corner, in which x0<fx0<x4 and y0<fy0<y3 and x0<fx1<x4 and y0<fy1<y3.

A phase difference (PD) for the ROI 704 may be determined by a weighted average of focal depths within each of the subwindows within the image portion 702 based on an amount of overlap of the ROI 704 with each of the subwindows. The overlap may be determined, as an example for one portion 706 based on the following equation:

$$\text{weight}_{0,1} = \frac{(x2 - fx0) \times (y1 - fy0)}{(x2 - x1) \times (y1 - y0)}$$

Weights for other portions of the ROI 704 may similarly be determined. The weights may be applied to determine a phase difference for the ROI 704 using the weights for each subwindow of the image portion 702, $\text{weight}_{i,j}$, and an output of MLPD module 212C for each subwindow of the image portion 702, $MLPD_{i,j}$, based on the following equation:

$$PD = \sum_{i=0}^{2} \sum_{j=0}^{3} \text{weight}_{i,j} \times MLPD_{i,j}$$

The weighting allows the overlapping regions of ROI 704 and image portion 702 to have a larger impact on the determined phase difference and non-overlapping regions to have zero weight, such that the final MLPD output may be controlled by the ROI 704.

The machine learning algorithm for determining focus information may be trained to determine a set of weights through off-line training. For example, a sample data set comprising images and associated ground truths may be used to determine the weights available for configuring at blocks 604, 608, 612, and 614. As another example, the weights may be retrieved from a configuration file, and the configuration file may be retrieved from a remote server.

Figure 8:
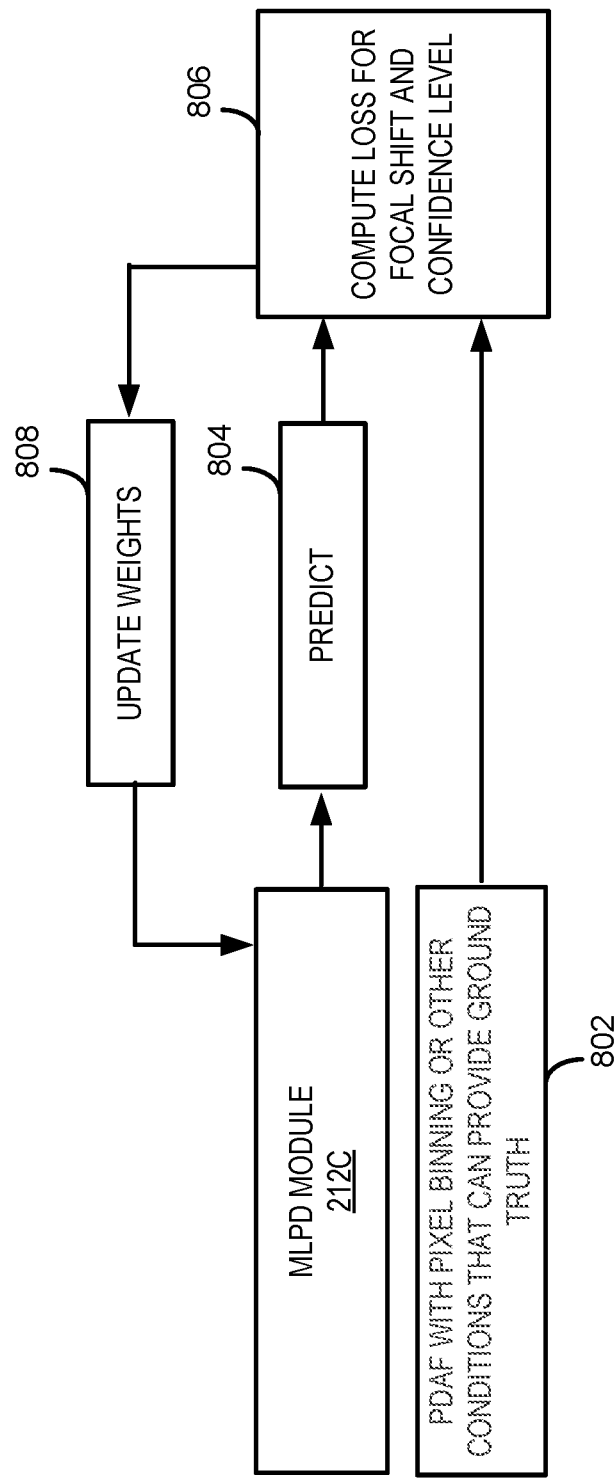
FIG. 8 is a block diagram illustrating a feedback system for updating machine learning used in an autofocus system according to some embodiments of the disclosure.

The machine learning algorithm for autofocus may be updated using feedback during operation of the image capture device as shown in FIG. 8. FIG. 8 is a block diagram illustrating a feedback system for updating machine learning used in an autofocus system according to some embodiments of the disclosure. A method 800 includes operating MLPD module 212C to generate predictions 804. The predictions 804 may be determined during capture of image data by the image capture device such that the machine learning algorithms are updated in real-time during use of the image capture device. Alternatively, aspects of method 800 may be performed off-line, such as when then the image capture device is plugged in. Phase detection auto focus (PDAF) is performed at block 802 based on binning or other conditions to provide a ground truth. At block 806, the ground truth of block 802 and the prediction of block 804 are compared, such as by computing a loss for focal shift and associated confidence level, in which the computed loss indicates a difference between the ground truth and the prediction. The computation of block 806 is used to update the stored weights at block 808, with the updated weights used by MLPD module 212C to determine future focus information.

In one or more aspects, techniques for supporting image processing, such as in supporting an image capture device, may include additional aspects, such as any single aspect or any combination of aspects described below or in connection with one or more other processes or devices described elsewhere herein. In a first aspect, supporting image processing may include an apparatus configured to perform operations including receiving first image data of a first scene from a first image sensor of a first camera, the first image data comprising phase shift information; determining a first focal distance for the first scene based on a machine learning algorithm by inputting the phase shift information to the machine learning algorithm; and controlling a focal position of the first camera based on the first focal distance. Additionally, the apparatus may perform or operate according to one or more aspects as described below.

In some implementations, the apparatus includes a wireless device, such as a UE, configured with one or more cameras and configured to communicate over a wireless network. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first image data further comprises a representation of the first scene, and the apparatus is configured to perform operations including: determining a characteristic of the first scene based on the first image data; and configuring the machine learning algorithm based on the characteristic of the first scene.

In a third aspect, in combination with one or more of the first aspect or the second aspect, configuring the machine learning algorithm comprises loading a plurality of weights based on the characteristic of the first scene, wherein the characteristic of the first scene comprises at least one of a repeating pattern scene, a multi-depth scene, or a low-light scene.

In a fourth aspect, in combination with one or more of the first aspect through the third aspect, the apparatus is further configured to perform operations including: determining a second focal distance based on the phase shift information without the machine learning algorithm; and determining a confidence level associated with the second focal distance.

In a fifth aspect, in combination with one or more of the first aspect through the fourth aspect, controlling the focal position of the first camera is based on the confidence level such that when a first criteria of the confidence level is satisfied controlling the focal position of the first camera is based on the first focal distance and when a second criteria of the confidence level is satisfied controlling the focal position of the first camera is based on the second focal distance.

In a sixth aspect, in combination with one or more of the first aspect through the fifth aspect, determining the first focal distance is based on the first criteria of the confidence level being satisfied such that the first focal distance is not determined when the first criteria is not satisfied.

In a seventh aspect, in combination with one or more of the first aspect through the sixth aspect, receiving the first image data further comprises receiving a representation of the first scene, wherein determining the first focal distance based on the machine learning algorithm further includes inputting at least a portion of the representation of the first scene to the machine learning algorithm.

In an eighth aspect, in combination with one or more of the first aspect through the seventh aspect, the apparatus is further configured to perform operations including: processing the first image data to determine a window of the first image data based on a region of interest, wherein determining the first focal distance based on the machine learning algorithm comprises inputting the window of the first image data to the machine learning algorithm, wherein a size of the window corresponds to an input size of the machine learning algorithm.

In a ninth aspect, in combination with one or more of the first aspect through the eighth aspect, the apparatus is further configured to perform operations including: determining a plurality of subwindows of the region of interest, wherein determining the first focal distance for the first scene comprises determining a plurality of first focal distances based on the machine learning algorithm by inputting the plurality of subwindows, and wherein controlling the focal position of the first camera is based on the plurality of first focal distances.

In a tenth aspect, in combination with one or more of the first aspect through the ninth aspect, controlling the focal position of the first camera is based on a weighted average of the plurality of first focal distances.

In an eleventh aspect, in combination with one or more of the first aspect through the tenth aspect, the apparatus is further configured to perform operations including: determining a second focal distance based on the phase shift information without the machine learning algorithm; and updating the machine learning algorithm based on the first focal distance and the second focal distance.

In a twelfth aspect, in combination with one or more of the first aspect through the eleventh aspect, the apparatus includes a first camera with the first image sensor and a lens, wherein the apparatus is configured with an autofocus (AF) algorithm to control a position of the lens based on a determined focal distance, such as the focal distance determined by the machine learning algorithm.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
    receiving first image data of a first scene from a first image sensor of a first camera, the first image data comprising phase shift information and a representation of the first scene;
    determining a characteristic of the first scene based on the first image data, wherein the characteristic of the first scene comprises at least one of a repeating pattern scene, a multi-depth scene, or a low-light scene;
    determining a first focal distance for the first scene based on a machine learning algorithm by inputting the phase shift information to the machine learning algorithm;
    configuring the machine learning algorithm based on the characteristic of the first scene, wherein the configuring comprises loading a plurality of weights based on the characteristic of the first scene; and
    controlling a focal position of the first camera based on the first focal distance.

2. The method of claim 1, further comprising:
    determining a second focal distance based on the phase shift information without the machine learning algorithm; and
    determining a confidence level associated with the second focal distance,
    wherein controlling the focal position of the first camera is based on the confidence level such that when a first criteria of the confidence level is satisfied controlling the focal position of the first camera is based on the first focal distance and when a second criteria of the confidence level is satisfied controlling the focal position of the first camera is based on the second focal distance.

3. The method of claim 2, wherein determining the first focal distance is based on the first criteria of the confidence level being satisfied such that the first focal distance is not determined when the first criteria is not satisfied.

4. The method of claim 1, wherein receiving the first image data further comprises receiving a representation of the first scene, wherein determining the first focal distance based on the machine learning algorithm further includes inputting at least a portion of the representation of the first scene to the machine learning algorithm.

5. The method of claim 4, further comprising:
    processing the first image data to determine a window of the first image data based on a region of interest, wherein determining the first focal distance based on the machine learning algorithm comprises inputting the window of the first image data to the machine learning algorithm,
    wherein a size of the window corresponds to an input size of the machine learning algorithm.

6. The method of claim 5, further comprising:
    determining a plurality of subwindows of the region of interest,
    wherein determining the first focal distance for the first scene comprises determining a plurality of first focal distances based on the machine learning algorithm by inputting the plurality of subwindows to the machine learning algorithm, and
    wherein controlling the focal position of the first camera is based on the plurality of first focal distances.

7. The method of claim 6, wherein controlling the focal position of the first camera is based on a weighted average of the plurality of first focal distances.

8. The method of claim 1, further comprising:
determining a second focal distance based on the phase shift information without the machine learning algorithm; and
updating the machine learning algorithm based on the first focal distance and the second focal distance.

9. An apparatus, comprising:
a memory storing processor-readable code; and
at least one processor coupled to the memory, the at least one processor configured to execute the processor-readable code to cause the at least one processor to perform operations including:
receiving first image data of a first scene from a first image sensor of a first camera, the first image data comprising phase shift information and a representation of the first scene;
determining a characteristic of the first scene based on the first image data, wherein the characteristic of the first scene comprises at least one of a repeating pattern scene, a multi-depth scene, or a low-light scene;
determining a first focal distance for the first scene based on a machine learning algorithm by inputting the phase shift information to the machine learning algorithm;
configuring the machine learning algorithm based on the characteristic of the first scene, wherein the configuring comprises loading a plurality of weights based on the characteristic of the first scene; and
controlling a focal position of the first camera based on the first focal distance.

10. The apparatus of claim 9, wherein the at least one processor is configured to execute the processor-readable code to cause the at least one processor to perform further operations including:
determining a second focal distance based on the phase shift information without the machine learning algorithm; and
determining a confidence level associated with the second focal distance,
wherein controlling the focal position of the first camera is based on the confidence level such that when a first criteria of the confidence level is satisfied controlling the focal position of the first camera is based on the first focal distance and when a second criteria of the confidence level is satisfied controlling the focal position of the first camera is based on the second focal distance.

11. The apparatus of claim 10, wherein determining the first focal distance is based on the first criteria of the confidence level being satisfied such that the first focal distance is not determined when the first criteria is not satisfied.

12. The apparatus of claim 9, wherein receiving the first image data further comprises receiving a representation of the first scene, wherein determining the first focal distance based on the machine learning algorithm further includes inputting at least a portion of the representation of the first scene to the machine learning algorithm.

13. The apparatus of claim 12, wherein the at least one processor is configured to execute the processor-readable code to cause the at least one processor to perform further operations including:
processing the first image data to determine a window of the first image data based on a region of interest,
wherein determining the first focal distance based on the machine learning algorithm comprises inputting the window of the first image data to the machine learning algorithm,
wherein a size of the window corresponds to an input size of the machine learning algorithm.

14. The apparatus of claim 13, wherein the at least one processor is configured to execute the processor-readable code to cause the at least one processor to perform further operations including:
determining a plurality of subwindows of the region of interest,
wherein determining the first focal distance for the first scene comprises determining a plurality of first focal distances based on the machine learning algorithm by inputting the plurality of subwindows, and
wherein controlling the focal position of the first camera is based on the plurality of first focal distances.

15. The apparatus of claim 14, wherein controlling the focal position of the first camera is based on a weighted average of the plurality of first focal distances.

16. The apparatus of claim 9, wherein the at least one processor is configured to execute the processor-readable code to cause the at least one processor to perform further operations including:
determining a second focal distance based on the phase shift information without the machine learning algorithm; and
updating the machine learning algorithm based on the first focal distance and the second focal distance.

17. A non-transitory computer-readable medium storing instructions that, when executed by a processor, cause the processor to perform operations comprising:
receiving first image data of a first scene from a first image sensor of a first camera, the first image data comprising phase shift information and a representation of the first scene;
determining a characteristic of the first scene based on the first image data, wherein the characteristic of the first scene comprises at least one of a repeating pattern scene, a multi-depth scene, or a low-light scene;
determining a first focal distance for the first scene based on a machine learning algorithm by inputting the phase shift information to the machine learning algorithm;
configuring the machine learning algorithm based on the characteristic of the first scene, wherein the configuring comprises loading a plurality of weights based on the characteristic of the first scene; and
controlling a focal position of the first camera based on the first focal distance.

18. The non-transitory, computer-readable medium of claim 17, wherein the operations further include:
determining a second focal distance based on the phase shift information without the machine learning algorithm; and
determining a confidence level associated with the second focal distance,
wherein controlling the focal position of the first camera is based on the confidence level such that when a first criteria of the confidence level is satisfied controlling the focal position of the first camera is based on the first focal distance and when a second criteria of the confidence level is satisfied controlling the focal position of the first camera is based on the second focal distance.

19. The non-transitory, computer-readable medium of claim 18, wherein determining the first focal distance is based on the first criteria of the confidence level being satisfied such that the first focal distance is not determined when the first criteria is not satisfied.

20. An apparatus, comprising:
a first camera comprising a first image sensor;
a memory storing processor-readable code; and
at least one processor coupled to the memory and to the first camera, the at least one processor configured to execute the processor-readable code to cause the at least one processor to:
receiving first image data of a first scene from the first image sensor, the first image data comprising phase shift information;
determining a phase detection auto focus (PDAF) focal distance based on the first image data and a confidence level associated with the PDAF focal distance;
when the confidence level is above a threshold level, controlling a focal position of the first camera based on the PDAF focal distance; and
when the confidence level is not above the threshold level:
determining a machine learning phase detection (MLPD) focal distance based on a machine learning algorithm by inputting at least a portion of the first image data to the machine learning algorithm;
processing the first image data to determine a window of the first image data based on a region of interest, wherein determining the MLPD focal distance comprises inputting the window of the first image data to the machine learning algorithm, wherein a size of the window corresponds to an input size of the machine learning algorithm; and
controlling the focal position of the first camera based on the MLPD focal distance.

21. The apparatus of claim 20, wherein the first image data further comprises a representation of the first scene, and wherein the at least one processor is configured to execute the processor-readable code to further cause the at least one processor to perform operations including:
determining a characteristic of the first scene based on the first image data; and
configuring the machine learning algorithm based on the characteristic of the first scene.

22. The apparatus of claim 20, wherein the at least one processor is configured to execute the processor-readable code to further cause the at least one processor to perform operations including:
determining a plurality of subwindows of the region of interest,
wherein determining the MLPD focal distance comprises determining a plurality of first focal distances based on the machine learning algorithm by separately inputting the plurality of subwindows to the machine learning algorithm, and
wherein controlling the focal position of the first camera is based on the plurality of first focal distances.

23. The apparatus of claim 22, wherein controlling the focal position of the first camera is based on a weighted average of the plurality of first focal distances.

* * * * *